(12) United States Patent
Hamanaka et al.

(10) Patent No.: US 6,366,406 B1
(45) Date of Patent: Apr. 2, 2002

(54) PLANAR MICROLENS ARRAY AND METHOD OF MANUFACTURING SAME

(75) Inventors: Kenjiro Hamanaka; Kenji Morio, both of Kanagawa (JP)

(73) Assignee: Micro Optics Co., Ltd., Kanagawa (JP)

( * ) Notice: Subject to any disclaimer, the term of this patent is extended or adjusted under 35 U.S.C. 154(b) by 0 days.

(21) Appl. No.: 09/233,319

(22) Filed: Jan. 20, 1999

(30) Foreign Application Priority Data

Jan. 21, 1998 (JP) .......................................... 10-009813

(51) Int. Cl.⁷ .............................................. G02B 27/10
(52) U.S. Cl. ...................................... 359/619; 359/620
(58) Field of Search ................................ 359/619, 620, 359/820, 455, 581

(56) References Cited

U.S. PATENT DOCUMENTS

| 5,969,867 A | * 10/1999 | Fukushima et al. ......... 359/581 |
| 6,069,740 A | * 5/2000 | Hamanaka .................. 359/620 |
| 6,099,135 A | * 8/2000 | Oda et al. .................. 362/31 |
| 6,144,496 A | * 11/2000 | Goto ........................... 359/619 |

FOREIGN PATENT DOCUMENTS

| EP | 426 441 A2 | 5/1991 |
| EP | 627 637 A1 | 12/1994 |
| EP | 659 521 A2 | 6/1995 |
| JP | 06-138454 A | 5/1994 |
| JP | 07-32381 A | 2/1995 |

\* cited by examiner

Primary Examiner—Ricky Mack
(74) Attorney, Agent, or Firm—Pillsbury Winthrop LLP

(57) ABSTRACT

A planar microlens array includes an array of convex microlenses made of an ultraviolet-curable synthetic resin having a high refractive index and disposed on a surface of a base glass plate. A cover glass plate is bonded to the array of convex microlenses by an adhesive layer made of an ultraviolet-curable synthetic resin having a low refractive index. A film made of an ultraviolet-curable synthetic resin is applied to a surface of the base glass plate remote from the array of convex microlenses. The film serves to prevent the planar microlens array from being warped when the ultraviolet-curable synthetic resin of the array of convex microlenses and the adhesive layer are cured.

7 Claims, 5 Drawing Sheets

PLANAR MICROLENS ARRAY AND METHOD OF MANUFACTURING SAME

BACKGROUND OF THE INVENTION

1. Field of the Invention

The present invention relates to a planar microlens array comprising a number of lenses arranged in a two-dimensional array, and a method of manufacturing such a planar microlens array.

2. Description of the Related Art

Planar microlens arrays are incorporated in liquid crystal display panels, for example. One liquid crystal display panel is shown in FIG. 1 of the accompanying drawings. As shown in FIG. 1, the liquid crystal display panel includes a planar microlens array 100 comprising an array of convex microlenses 102 provided on a surface of a base glass plate 101. The convex microlenses 102 are made of an ultraviolet-curable synthetic resin having a high refractive index. The array of convex microlenses 102 is covered with a cover glass plate 103 which is bonded to the array of convex microlenses 102 by an adhesive layer 104 that is made of an ultraviolet-curable synthetic resin having a low refractive index.

A liquid crystal layer 106 is filled between the cover glass plate 103 and a glass substrate 105 spaced from the cover glass plate 103. The glass substrate 105 supports transparent pixel electrodes 107 on its surface facing the liquid crystal layer 106. The surface of the glass substrate 105 Includes areas that are free of the transparent pixel electrodes 107 and carry interconnections and TFTs (Thin Film Transistors) which do not pass applied light. Electrodes 108 which confront the transparent pixel electrodes 107 are mounted on a surface of the cover glass plate 103 that faces the liquid crystal layer 106.

The planar microlens array 100 operates as follows: Applied light is converged by the convex microlenses 102 onto the transparent pixel electrodes (pixel apertures) 107 to brighten an image projected onto a screen.

Presently available liquid crystal display panels have pixel dimensions ranging from about 40 $\mu$m to 60 $\mu$m. It is expected that the pixel dimensions will be reduced to about 20 $\mu$m to 30 $\mu$m in the future to meet demands for clearer displayed images.

The smaller pixel dimensions require the convex microlenses 102 to be reduced in size, resulting in a shorter focal length. For efficient utilization of the applied light, it is necessary that the focal point of the convex microlenses 102 be positioned substantially on the transparent pixel electrodes 107. To meet such a requirement, the cover glass plate 103 must be reduced in thickness.

Each of the convex microlenses 102 and the adhesive layer 104 is made of an ultraviolet-curable synthetic resin. The ultraviolet-curable synthetic resin shrinks when cured. The cover glass plate 103 can withstand the shrinkage of the ultraviolet-curable synthetic resin, i.e., can maintain its dimensional stability, when the ultraviolet-curable synthetic resin shrinks, providing that the cover glass plate 103 is thinner, it tends to yield and allow the entire planar microlens array 102 to warp upon shrinkage of the ultraviolet-curable synthetic resin, as shown in FIG. 2 of the accompanying drawings.

SUMMARY OF THE INVENTION

It is an object of the present invention to provide a planar microlens array which is resistant to warpage upon shrinkage of an ultraviolet-curable synthetic resin used therewith.

According to an aspect of the present invention, a planar microlens array includes a base glass plate, a cover glass plate, an array of microlenses made of an ultraviolet-curable synthetic resin and disposed between the base glass plate and the cover glass plate, and a film of an ultraviolet-curable synthetic resin disposed on a surface of the base glass plate remote from the array of microlenses.

When the ultraviolet-curable synthetic resins are cured by exposure to ultraviolet radiation, the shrinkage of the ultraviolet-curable synthetic resin of the film is kept in equilibrium with the shrinkage of the ultraviolet-curable synthetic resin of the convex microlenses. Thus, any unwanted warpage of the planar microlens array is minimized in its entirety.

The array of microlenses may comprise an array of convex microlenses made of an ultraviolet-curable synthetic resin having a relatively high refractive index and disposed on a flat surface of the base glass plate, or an array of convex microlenses made of an ultraviolet-curable synthetic resin having a relatively high refractive index and disposed in respective concavities defined in a flat surface of the base glass plate.

The film may be made of a material which is the same as or different from the ultraviolet-curable synthetic resin of the array of microlenses.

The planar microlens array may further include a protective film applied to a surface of the film on the base glass plate for protection of the planar microlens array during shipment or handling.

According to another aspect of the present invention, a method of manufacturing a planar microlens array comprises the steps of shaping an uncured ultraviolet-curable synthetic resin into an array of microlenses between a base glass plate and a cover glass plate, forming an uncured ultraviolet-curable synthetic resin into a film on a surface of the base glass plate remote from the array of microlenses, and simultaneously curing the uncured ultraviolet-curable synthetic resin shaped into the array of microlenses and the uncured ultraviolet-curable synthetic resin formed into the film by exposure to ultraviolet radiation.

The uncured ultraviolet-curable synthetic resin may be formed into the film on the base glass plate by a stamper, a brush, or a spinner.

According to still another aspect of the present invention, a method of manufacturing a planar microlens array comprises the steps of shaping an uncured ultraviolet-curable synthetic resin into an array of microlenses between a base glass plate and a cover glass plate, placing an uncured ultraviolet-curable synthetic resin on a surface of the base glass plate remote from the array of microlenses, laying a protective film over the uncured ultraviolet-curable synthetic resin placed on the surface of the base glass plate, spreading the last-mentioned uncured ultraviolet-curable synthetic resin into a film with a flat surface of a stamper brought into direct contact with the protective film, and simultaneously curing the uncured ultraviolet-curable synthetic resin shaped into the array of microlenses and the uncured ultraviolet-curable synthetic resin spread into the film by exposure to ultraviolet radiation.

The above and other objects, features, and advantages of the present invention will become more apparent from the following description when read in conjunction with the accompanying drawings in which preferred embodiments of the present invention are shown by way of illustrative example.

DETAILED DESCRIPTION OF THE PREFERRED EMBODIMENTS

Figure 1:
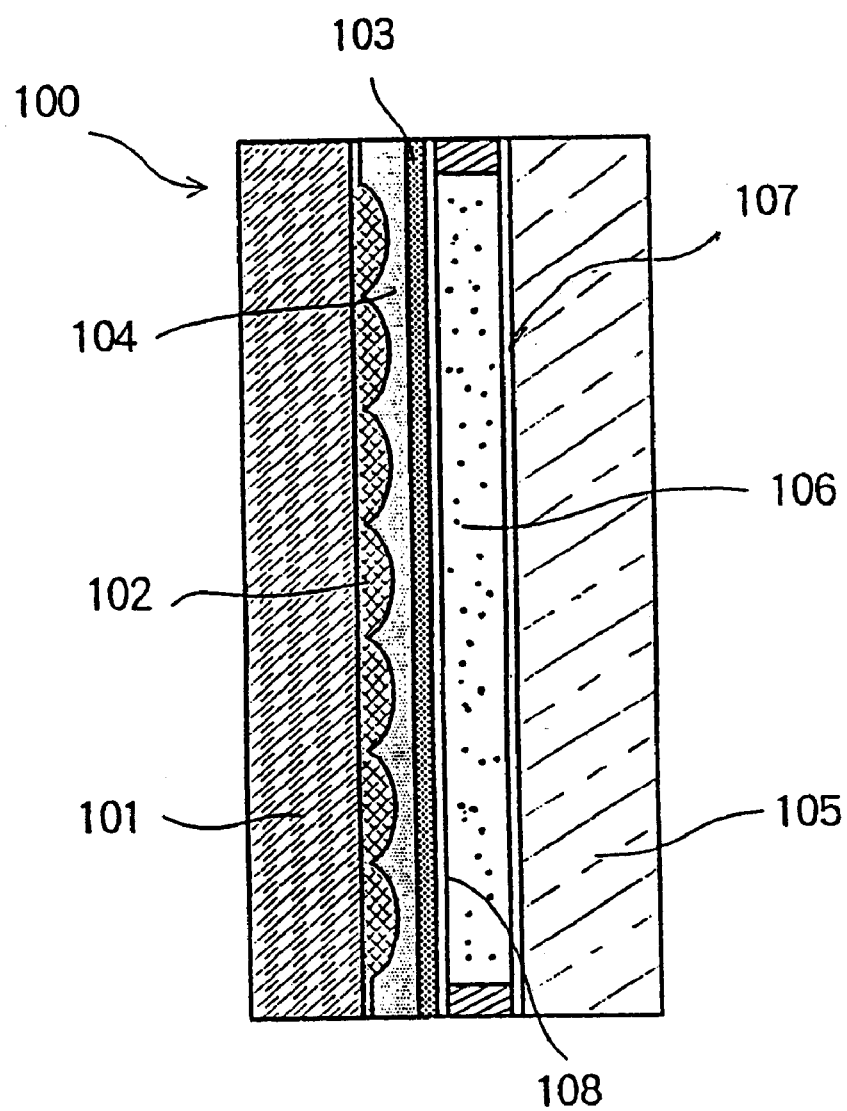
FIG. 1 is a fragmentary cross-sectional view of a liquid crystal display panel incorporating a conventional planar microlens array.
Figure 2:
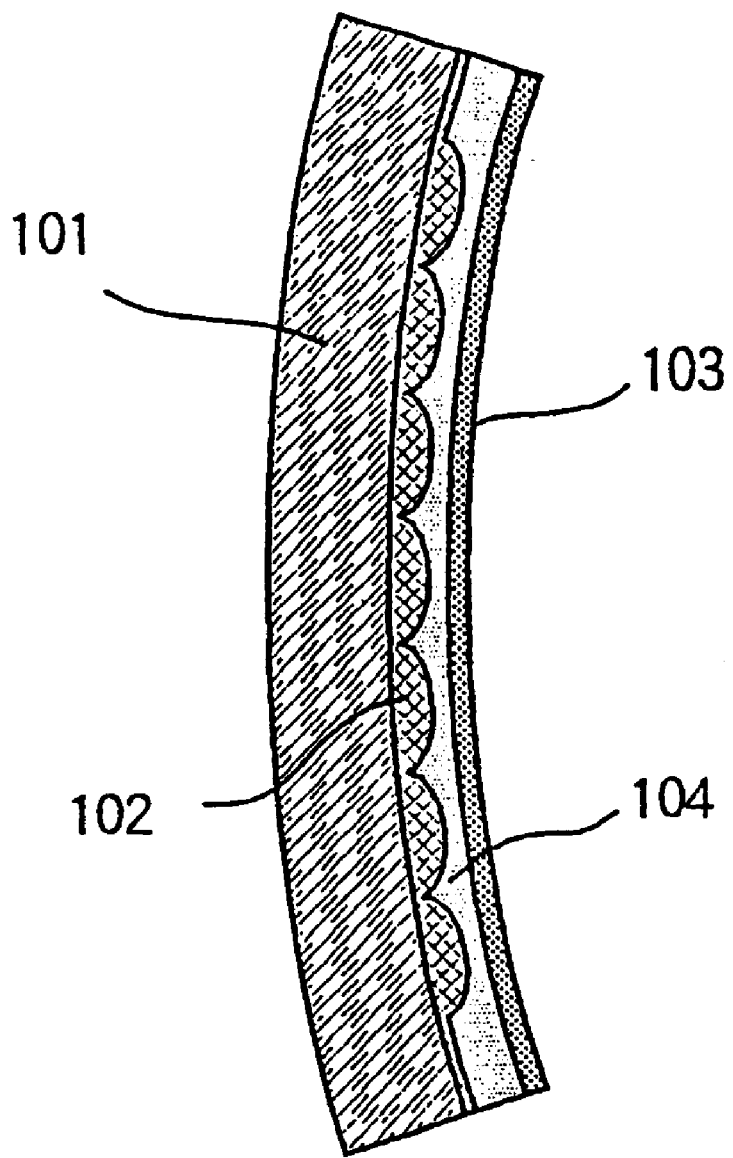
FIG. 2 is a fragmentary cross-sectional view showing the manner in which the conventional planar microlens array is warped.

Like or corresponding parts are denoted by like or corresponding reference characters throughout all views.

Figure 3:
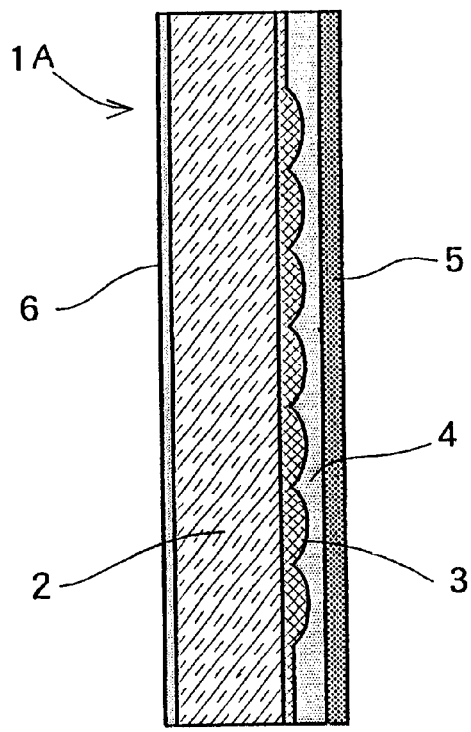
FIG. 3 is a fragmentary cross-sectional view of a planar microlens array according to an embodiment of the present invention.

As shown in FIG. 3, a planar microlens array 1A according to an embodiment of the present invention comprises an array of convex microlenses 3 mounted on a flat surface of a base glass plate 2. The convex microlenses 3 have respective convex surfaces facing away from the base glass plate 2. The convex microlenses 3 are made of an ultraviolet-curable synthetic resin having a relatively high refractive index. The array of convex microlenses 3 is covered with a cover glass plate 5 which is bonded to the array of convex microlenses 3 by an adhesive layer 4 that is made of an ultraviolet-curable synthetic resin having a relatively low refractive index. The planar microlens array 1A also has a film 6 comprising an ultraviolet-curable synthetic resin which is applied to a surface of the base glass plate 2 remote from the array of convex microlenses 3. The ultraviolet-curable synthetic resin of the film 6 is the same as the ultraviolet-curable synthetic resin of the array of convex microlenses 3.

The base glass plate 2 has a thickness ranging from 0.7 mm to 1.1 mm. Each of the convex microlenses 3 has a size, which may be a diameter or a diagonal or a similar dimension, ranging from 20 $\mu$m to 60 $\mu$m, and a thickness ranging from 5 $\mu$m to 25 $\mu$m. The cover glass plate 5 has a thickness in the range of from 50 $\mu$m to 200 $\mu$m. If the planar microlens array 1A is incorporated in a liquid crystal panel, then the size of each of the convex microlenses 3 is approximately the same as the size of a pixel.

The film 6 of ultraviolet-curable synthetic resin serves to protect the base glass plate 2 and hence the entire planar microlens array 1A from undue warpage upon shrinkage of the ultraviolet-curable synthetic resin of the convex microlenses 3 and the adhesive layer 4. The thickness of the film 6 should be selected so as to exert sufficient resistive forces to counterbalance warping forces applied to the base glass plate 2 by the convex microlenses 3 and the adhesive layer 4 when they shrink.

A process of manufacturing the planar microlens array 1A will be described below with reference to FIG. 4.

First, an uncured ultraviolet-curable synthetic resin having a high refractive index is coated onto a surface of the base glass plate 2, and then shaped into the convex microlenses 3 by a stamper (not shown). Thereafter, an uncured ultraviolet-curable synthetic resin having a low refractive index is applied to form the adhesive layer 4 between the convex microlenses 3 and the cover glass plate 5.

Figure 4:
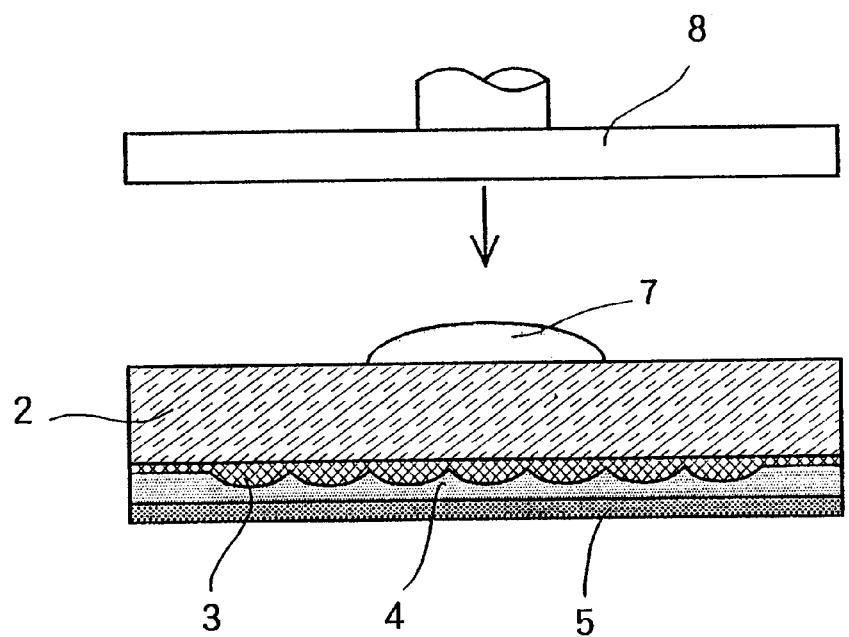
FIG. 4 is a fragmentary cross-sectional view illustrating a process of manufacturing the planar microlens array shown in FIG. 3.

Then, as shown in FIG. 4, the assembly formed so far is turned upside down, and an uncured ultraviolet-curable synthetic resin 7 is placed on the surface of the base glass plate 2 remote from the convex microlenses 3. The uncured ultraviolet-curable synthetic resin 7 is then pressed and spread into a film 6 on the base glass plate 2 by a lower flat shaping surface of a stamper 8 which has been treated with a release agent. Alternatively, the uncured ultraviolet-curable synthetic resin 7 may be spread into the film 6 by a brush or a spinner.

Thereafter, ultraviolet radiation is applied to the uncured ultraviolet-curable synthetic resin shaped into the convex microlenses 3, the uncured ultraviolet-curable synthetic resin to form the adhesive layer 4, and the uncured ultraviolet-curable synthetic resin pressed and shaped into the film 6 on the base glass plate 2, thereby curing these synthetic resins. Since all these synthetic resins are simultaneously cured, the planar microlens array 1A is prevented from being unduly warped in the manufacturing process. Specifically, the shrinkage of the ultraviolet-curable synthetic resin pressed and shaped into the film 6 is kept in equilibrium with the shrinkage of the ultraviolet-curable synthetic resin shaped into the convex microlenses 3 and the shrinkage of the ultraviolet-curable synthetic resin to form the adhesive layer 4. Thus, even if the cover glass plate 2 is made thinner for smaller pixels, any unwanted warpage of the planar microlens array 1A is minimized in its entirety.

Figure 5:
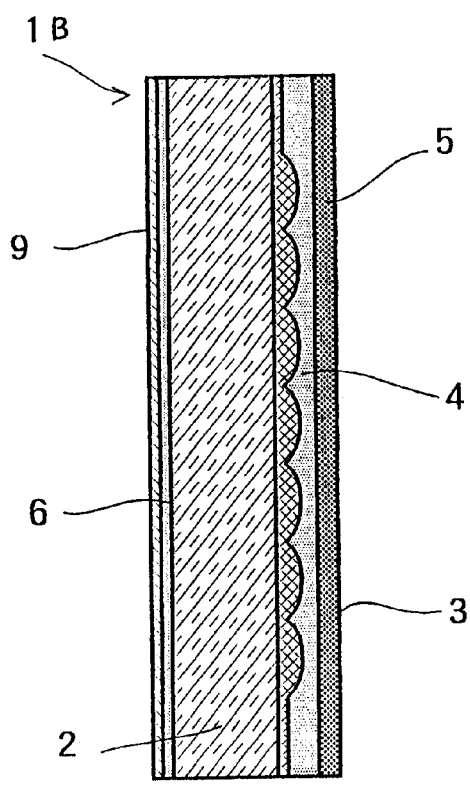
FIG. 5 is a fragmentary cross-sectional view of a planar microlens array according to another embodiment of the present invention.

FIG. 5 shows a planar microlens array 1B according to another embodiment of the present invention. The planar microlens array 1B shown in FIG. 5 differs from the planar microlens array 1A shown in FIG. 3 in that a transparent protective film 9 is applied to an outer surface of the film 6. The protective film 9 serves to protect the surface of the planar microlens array 1B against damage while the planar microlens array 1B is being shipped or handled. The protective film 9 may be applied to an outer surface of the cover glass plate 5, rather than the outer surface of the film 6, or may be applied to both the outer surfaces of the cover glass plate 5 and the film 6. If the protective film 9 will subsequently be peeled off, then the protective film 9 need not be transparent.

Figure 6:
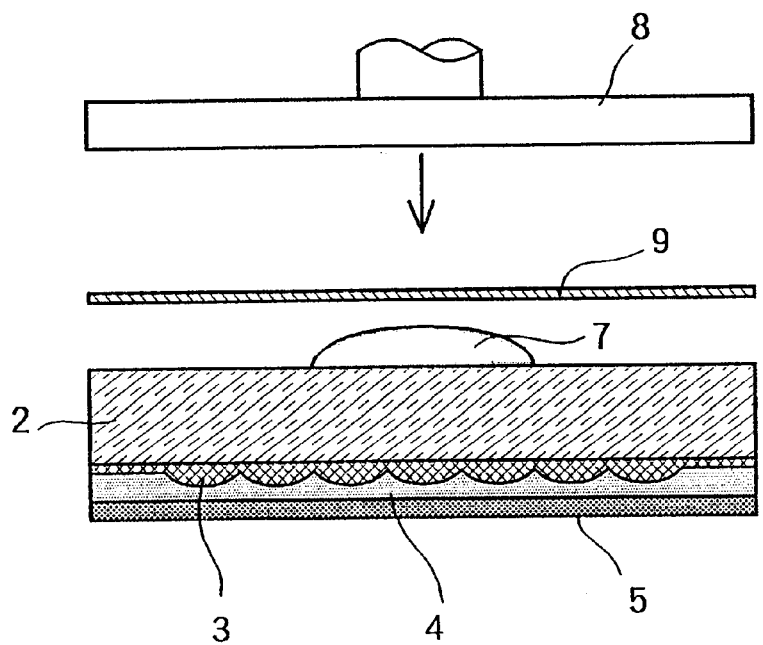
FIG. 6 is a fragmentary cross-sectional view illustrating a process of manufacturing the planar microlens array shown in FIG. 5.

FIG. 6 illustrates a process of manufacturing the planar microlens array 1B. The process of manufacturing the planar microlens array 1B is similar to the process of manufacturing the planar microlens array 1A except that after the uncured ultraviolet-curable synthetic resin 7 is placed on the surface of the base glass plate 2 remote from the convex microlenses 3, the protective film 9 is laid over the uncured ultraviolet-curable synthetic resin 7. The uncured ultraviolet-curable synthetic resin 7 is pressed and spread into a film on the base glass plate 2 by the stamper 8 which is brought into direct contact with the protective film 9, but not with the uncured ultraviolet-curable synthetic resin 7.

Because the protective film 9 is positioned between the stamper 8 and the uncured ultraviolet-curable synthetic resin 7, the lower flat shaping surface of the stamper 8 does not need to be treated with a release agent.

Figure 7:
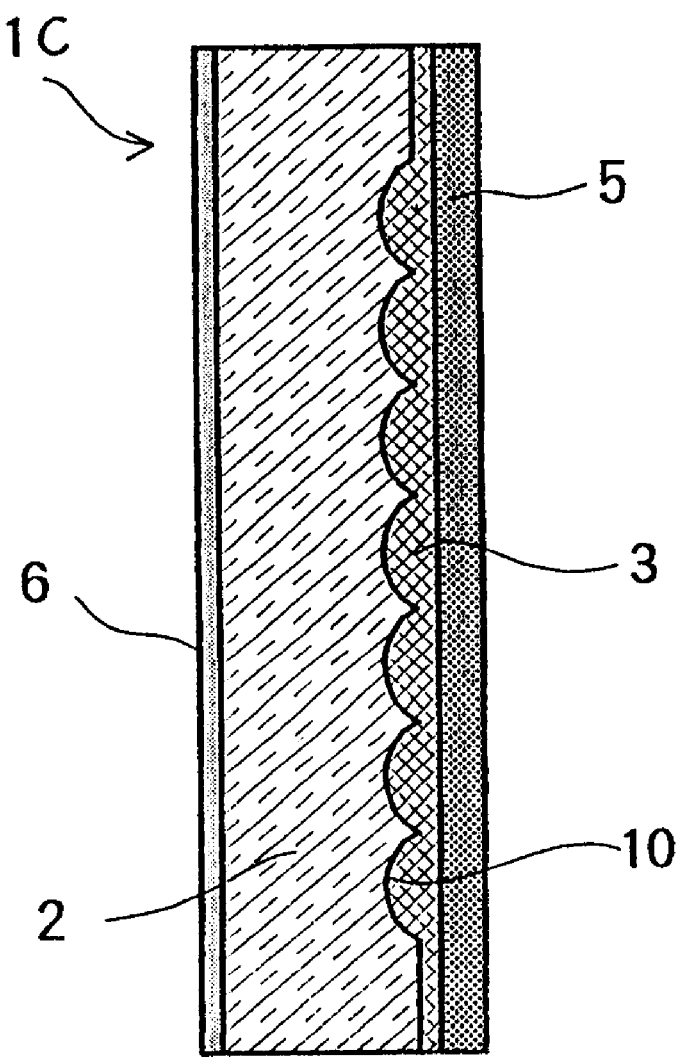
FIG. 7 is a fragmentary cross-sectional view of a planar microlens array according to still another embodiment of the present invention.

FIG. 7 shows a planar microlens array 1C according to still another embodiment of the present invention. As shown in FIG. 7, the planar microlens array 1C comprises a base glass plate 2 having an array of small concavities 10 defined in a flat surface thereof by a wet etching processor the like. The concavities 10 are filled with an ultraviolet-curable synthetic resin having a high refractive index to produce an array of convex microlenses 3. The convex microlenses 3 have respective convex surfaces facing toward the base glass plate 2. A cover glass plate 5 is applied directly to the convex microlenses 3 remotely from the base glass plate 2. A film 6 of an ultraviolet-curable synthetic resin is applied to a surface of the base glass plate 2 remote from the array of convex microlenses 3.

When the planar microlens array 1C shown in FIG. 7 is manufactured, the uncured ultraviolet-curable synthetic resin shaped into the film 6 and the uncured ultraviolet-curable synthetic resin shaped into the convex microlenses 3 are simultaneously cured by exposure to ultraviolet radiation. Therefore, the planar microlens array 1C is prevented from being unduly warped in the manufacturing process.

Although certain preferred embodiments of the present invention have been shown and described in detail, it should be understood that various changes and modifications may be made therein without departing from the scope of the appended claims.

What is claimed is:

1. A planar microlens array comprising:
    a base glass plate including a first surface and a second surface;
    a cover glass plate disposed adjacent said first surface of said base glass plate;
    an array of microlenses made of an ultraviolet-curable synthetic resin and disposed between said first surface of said base glass plate and said cover glass plate; and
    a film of an ultraviolet-curable synthetic resin disposed on said second surface of said base glass plate opposite said array of microlenses.

2. A planar microlens array according to claim 1, further comprising an adhesive layer bonding said cover glass plate to said array of microlenses, wherein said array of microlenses comprises an array of convex microlenses made of an ultraviolet-curable synthetic resin having a refractive index that is higher than a refractive index of the adhesive layer and being disposed on a flat portion of said first surface of said base glass plate.

3. A planar microlens array according to claim 1, wherein said array of convex microlenses comprises an array of convex microlenses made of an ultraviolet-curable synthetic resin having a refractive index that is higher than a refractive index of the base glass plate and being disposed in respective concavities defined in a flat portion of said first surface of said base glass plate.

4. A planar microlens array according to any one of claims 1 through 3, wherein said film is made of a material which is the same as the ultraviolet-curable synthetic resin of said array of microlenses.

5. A planar microlens array according to claim 4, further comprising:
    a protective film applied to a surface of said film on said base glass plate and/or a surface of said cover glass plate.

6. A method of manufacturing a planar microlens array comprising:
    shaping an uncured ultraviolet-curable synthetic resin into an array of convex microlenses between a first surface of a base glass plate and a cover glass plate;
    forming an uncured ultraviolet-curable synthetic resin into a film on a second surface of said base glass plate opposite said array of microlenses; and
    exposing to ultraviolet radiation and curing said uncured ultraviolet-curable synthetic resin array of convex microlenses and said uncured ultraviolet-curable synthetic resin film simultaneously.

7. A method of manufacturing a planar microlens array comprising:
    shaping an uncured ultraviolet-curable synthetic resin into an array of microlenses between a first surface of a base glass plate and a cover glass plate;
    placing an uncured ultraviolet-curable synthetic resin on a second surface of said base class plate opposite said array of microlenses;
    laying a protective film over said uncured ultraviolet-curable synthetic resin placed on said second surface of said base glass plate;
    spreading the uncured ultraviolet-curable synthetic resin placed on said surface of said base plate into a film using a flat surface of a stamper brought into direct contact with said protective film; and
    exposing to ultraviolet radiation and curing said uncured ultraviolet-curable synthetic resin array of microlenses and said uncured ultraviolet-curable synthetic resin film simultaneously.

* * * * *